(12) United States Patent
Prieto

(10) Patent No.: US 8,382,375 B2
(45) Date of Patent: Feb. 26, 2013

(54) MOTOR SHAFT VIBRATION ISOLATOR FOR ELECTRIC SUBMERSIBLE PUMPS

(75) Inventor: Carlos A. Prieto, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 528 days.

(21) Appl. No.: 12/691,860

(22) Filed: Jan. 22, 2010

(65) Prior Publication Data

US 2011/0182535 A1 Jul. 28, 2011

(51) Int. Cl.
*F16C 3/00* (2006.01)
*F16C 35/00* (2006.01)

(52) U.S. Cl. .............. 384/97; 384/428; 384/535

(58) Field of Classification Search ........... 384/97, 384/98, 193, 195, 196, 199, 200, 215, 226, 384/227, 230, 231, 234, 235, 428, 440, 535, 384/536, 581, 582, 624, 904; 180/381; 248/560, 248/562, 568, 638; 175/104, 107; 416/144, 416/500
See application file for complete search history.

(56) References Cited

U.S. PATENT DOCUMENTS

| | | | |
|---|---|---|---|
| 3,545,301 A | 12/1970 | Richter | |
| 4,134,309 A * | 1/1979 | Balke et al. | 384/100 |
| 4,496,252 A * | 1/1985 | Horler et al. | 384/215 |
| 4,873,798 A | 10/1989 | Sato | |
| 5,564,537 A | 10/1996 | Shoureshi | |
| 5,595,117 A | 1/1997 | Chrigui | |
| 5,637,938 A | 6/1997 | Vukorpa et al. | |
| 6,070,734 A | 6/2000 | Hunt et al. | |
| 6,558,041 B2 * | 5/2003 | Laos | 384/99 |
| 6,817,771 B2 | 11/2004 | Campbell | |
| 2007/0107972 A1 * | 5/2007 | Sakamaki | 180/381 |

FOREIGN PATENT DOCUMENTS

| | | |
|---|---|---|
| EP | 1887125 A1 | 2/2008 |
| GB | 1187326 | 4/1970 |
| JP | 10-018961 | 1/1998 |

* cited by examiner

Primary Examiner — James Pilkington
(74) Attorney, Agent, or Firm — Steve Rosenblatt

(57) ABSTRACT

A vibration dampening system for a motor shaft in an electric submersible pump ESP uses axially extending arms in one or opposed directions from a fixed portion of a motor shaft bearing. The weights can have their location adjusted to tune the device to the natural frequencies of the rotating shaft and to add an ability to address vibration in more than one plane. Openings are provided in the support for the arms that hold the weight so that arm vibration can create turbulence and improve heat dissipation in the oil for improved bearing life. Bearing cost can be reduced using more economical materials without sacrificing bearing life.

18 Claims, 3 Drawing Sheets

MOTOR SHAFT VIBRATION ISOLATOR FOR ELECTRIC SUBMERSIBLE PUMPS

FIELD OF THE INVENTION

The field of this invention is devices that reduce shaft vibration by absorbing the vibration and using weights supported at a distance from the shaft that respond to the frequency of excitation coming from the shaft to take up the vibration and more particularly application of this principle in highly confined spaces such as a motor for an electric submersible pump or ESP.

BACKGROUND OF THE INVENTION

Most producing oil fields utilize an electrically driven downhole pumping system to bring oil to the surface. The pump typically comprises several staged centrifugal pump sections that can be specifically configured to suit the production and wellbore characteristics of a given application. ESP systems are a common artificial-lift method, providing flexibility over a range of sizes and output flow capacities. ESPs are typically used in older reservoirs on wells with high water cuts (percentage of water to oil).

ESPs provide cost effective production by boosting fluid production from these less efficient, older reservoirs. ESP completions are an alternative means of obtaining artificial lift in wells having low bottom hole pressures. ESP completions are the most efficient choice for high volume capable wells. Production rates up to 90,000 barrels (14,500-m3) of fluid per day have been obtained using large ESPs.

The ESP system consists of a number of components that turn a staged series of centrifugal pumps to increase the pressure of the well fluid and push it to the surface. The energy to turn the pump comes from a high-voltage (3-kV to 5-kV) alternating-current source to drive a special motor that can work at high temperatures of up to 300-deg F (150-deg C) and high pressures of up to 5,000-lb/in$^2$ (34-MPa), from deep wells of up to 12,000-ft (3.7-km) deep with high energy requirements of up to about 1,000-hp (750-kW).

The ESP uses a centrifugal pump which is attached to an electric motor and operates while submersed in the well fluid. The sealed electric motor spins a series of impellers. Each impeller in the series forces fluid through a diffuser into the eye of the one above it. In a typical 4-in submersible pump, each impeller will add an approximately 9-psi (60-KPa) of pressure. For example, a typical 10-stage pump will develop a pressure of about 90-psi (600-KPa) at its outlet (i.e. 10 impellers×9-psi). The lift and capacity of the pump is related to impeller diameter and the width of the impeller vanes. The pump pressure is a function of the number of impellers. For example, a ½-hp 7-stage pump may deliver a high volume of water at a low pressure while a ½-hp 14-stage pump will deliver a lower volume, but at a greater pressure. Like all other centrifugal pumps, an increase in well depth or discharge pressure will reduce the capacity.

As one of the higher volume methods of lift, ESPs offer advantages over some other high volume methods because they can create a higher drawdown on the formation and achieve more production. However, they also present problems that must be solved, such as gas interference and sand production.

More than 60 percent of producing oil wells require some type of assisted lift technology to produce the recoverable oil originally in place. In 2000 about 14 percent of some 832,000 wells lifted worldwide are/were lifted with ESPs.

Artificial lift systems are an essential part of production, especially in maturing oil fields where the reserves lack sufficient pressure to easily bring the crude oil to the surface. As the production of natural gas and crude oil continues to diminish and water production increases (particularly in water-driven reservoirs), the lease operator may begin waterflood, an enhanced recovery method in which water is injected into the reservoir at one well to drive hydrocarbons to other wells. Given time, however, oil production will continue to fall and water production will increase. As this occurs, the pumping time for a given beam pump system, for example, increases until the lease pumper is producing the well 24 hours a day. At this time, the most practical way to improve production is to install a system with greater production capability.

Where heavy crudes (up to a point), limited access to injection gas, higher water cut or low bottomhole pressures preclude the gas lift option, an ESP can be used. ESPs generate centrifugal force to pressurize wellbore fluids and are capable of lifting fluids from depths of 20,000-ft (6,100-m) or more. However, installations to 10,000-ft and less are more common.

ESPs are dynamic pumps that use multiple stages to raise the liquid pressure high enough to overcome static head of the discharge column. These pumps were traditionally installed in high-volume artificial-lift applications that are seldom appropriate for deliquifying gas wells.

However, new work from Centrilift shows using ESPs down to 40-bpd to 100-bpd at depth to lift liquids off gas wells. The motor is shrouded, or re-circulated, or just constructed with high temperature trim. The pumps used were higher volume stages run to the left of the curve.

ESP systems may be the best choice for larger oil wells that have declined and desire to increase production, such as the case in many Middle East countries. Older gas lift systems with now high water cut would produce to lower pressure and produce higher recoverable oil if money were spent to reequip them with ESPs. ESPs offer the highest yield of most deep-well artificial lift systems, but suffer the highest frequency of expense and repair. ESP systems also offer superior performance in somewhat gaseous and water-infused environments.

Gas and water occur naturally in high percentages with crude oil. The gas and water must be separated from the flow of crude oil in order to pump it to the surface. High percentages can cause gas locking in the pump mechanism, resulting in a serious decrease in flow delivery—requiring the entire production string to be pulled from the well and re-primed.

The motors for ESPs are specially designed and because of where they are deployed are long and narrow. The motors operate in high temperature applications and need to run for long periods reliably. One issue with these motors is bearing life, which is affected by vibration. Another issue is the limited space around the motor shaft in the motor housing in which any device that dampens such vibration can be disposed.

Efforts in other applications where space is not a significant issue have been undertaken to address dampening shaft vibrations with weights placed on a common sleeve and radially and axially displaced from the shaft axis. These weights were all interdependent because they were fixated to the sleeve and their positions with respect to the sleeve could not be simply adjusted for tuning purposes. The automotive application was also not one where space limitations were an issue. This system is described in U.S. Pat. No. 6,817,771. Various other dampening devices for vibration that have been tried in the past are reflect in U.S. Pat. No. 3,545,301; 5,637,938; 5,595, 117; 5,564,537; EP 1,887125A; GB 1, 187326; JP 1998 018961 and U.S. Pat. No. 4,873,798.

The present invention addresses the need to dampen vibrations in a rotating shaft turning in a confined housing and in a potentially hostile environment. The device has flexibility to be tuned so that its natural frequency approximates the vibration frequency of the shaft. Using an adjustment feature the weights can be moved on axially extending cantilevered beams that take up less space in a confined area due to the axial orientation. The vibration of the dampener weights with oil ports in the stationary support structure also adds a potential benefit in improved heat transfer for the bearing oil to dissipate heat through the housing. Those skilled in the art will better appreciate other aspects of the invention from a review of the detailed description of the preferred embodiment and the associated drawings while appreciating that the appended claims describe the full scope of the invention.

SUMMARY OF THE INVENTION

A vibration dampening system for a motor shaft in an ESP uses axially extending arms in one or opposed directions from a fixed portion of a motor shaft bearing. The weights can have their location adjusted to tune the device to the natural frequencies of the rotating shaft and to add an ability to address vibration in more than one plane. Openings are provided in the support for the arms that hold the weight so that arm vibration can create turbulence and improve heat dissipation in the oil for improved bearing life. Bearing cost can be reduced using more economical materials without sacrificing bearing life.

DETAILED DESCRIPTION OF THE PREFERRED EMBODIMENT

Figure 1:
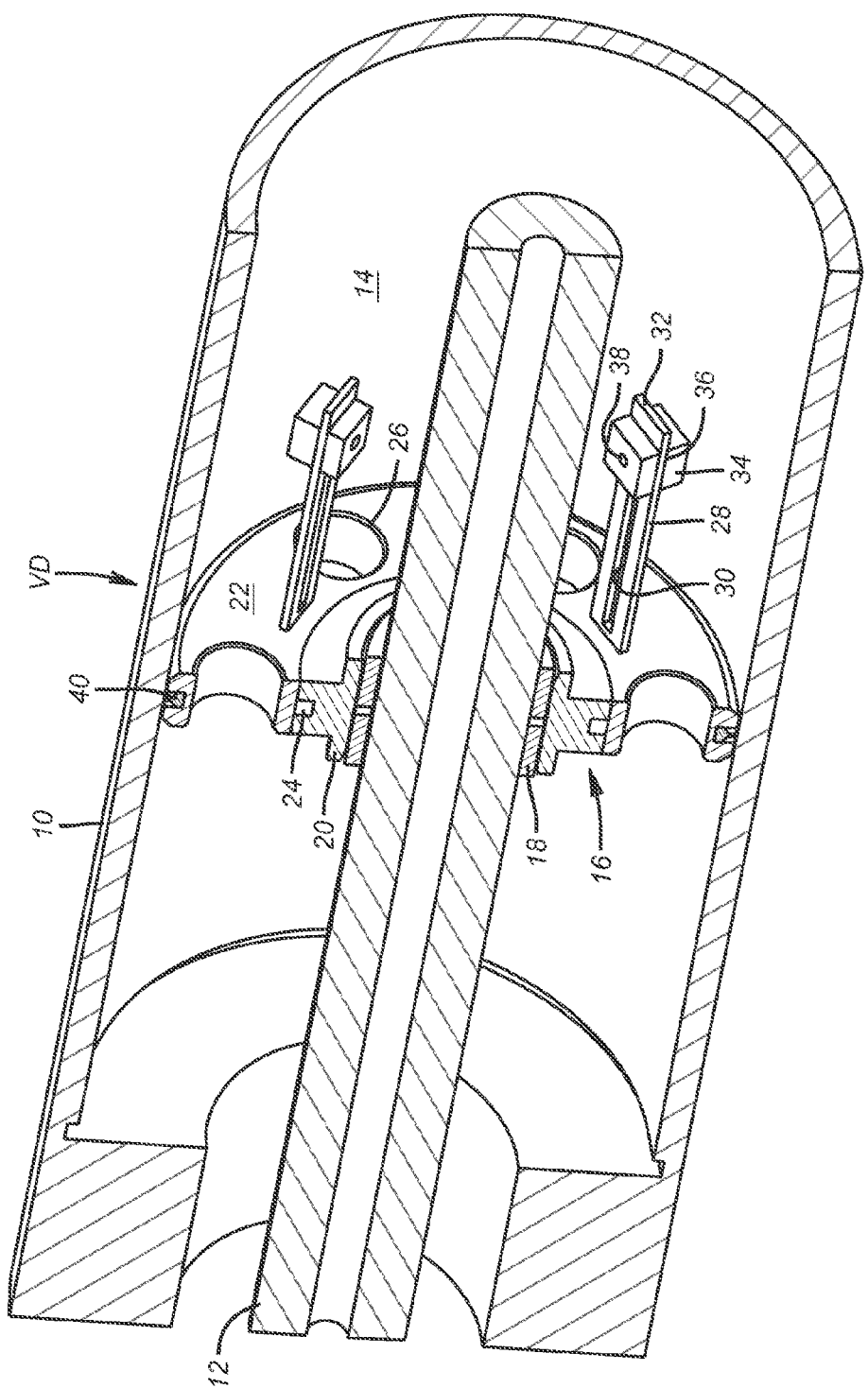
FIG. 1 is a perspective view of the vibration dampening assembly showing the openings for lubricant movement.
Figure 1A:
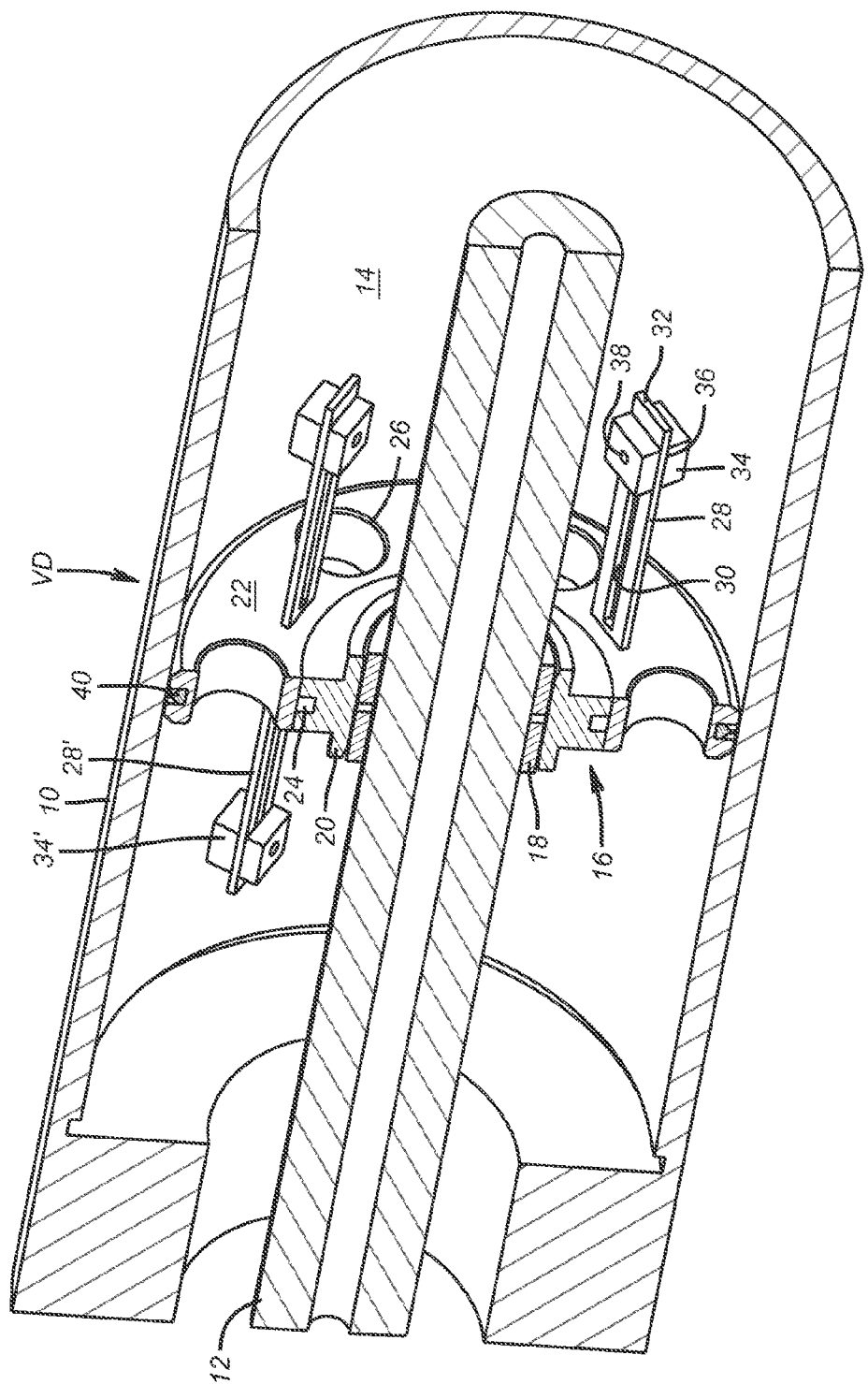
FIG. 1a shows the view of FIG. 1 with a vibration dampening assembly extending in opposed directions, 28 and 28' for differing lengths and having different amounts of weights, 34 and 34'.
Figure 2:
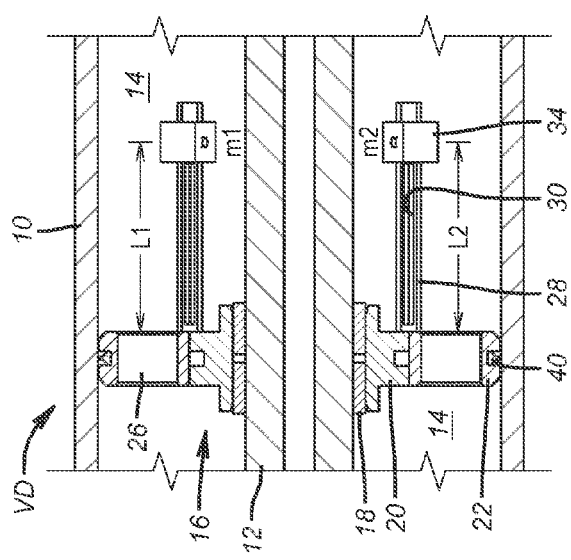
FIG. 2 is the view of FIG. 1 in section.

FIG. 1 illustrates a motor shaft 12 in an elongated motor housing 10 for an ESP. That same housing 10 is also shown, in part, in FIG. 3 to locate the vibration dampener VD. The annular space 14 around the shaft 12 contains a lubricant for the bearing 16. The bearing 16 has an inner sleeve 18 supported by inner ring 20 that rotate with the shaft 12. The outer member 22 is secured in the housing 10 and supports the vibration dampener VD. A series of rollers are at the interface of the inner ring 20 and the outer member 22. A series of openings 26 are disposed in the outer member 22 to allow lubricating oil (not shown) that is in annular space 14 to move axially in opposed directions within the housing 10. Outer member 22 has a series of axially extending arms 28 that preferably extend at 90 degrees to the outer member or parallel to shaft 12. An elongated slot 30 runs the substantial length of the arm 28 and can optionally run to its end 32. A weight 34 has a slot 36 to allow the weight 34 to slide onto the arm 28 and to be secured with a fastener 38 at a desired point along arm 28. The axial position of the outer member 22 can be maintained with snap rings on opposed sides or other fasteners (not shown) or with end seals or gaskets such as 40. Whichever mounting system is used, the vibration in the shaft 12 needs to be conducted to the vibration damper VD so that the weights 34 can oscillate or vibrate when excited by shaft vibration.

While two arms 30 are illustrated in the half section the number of arms can vary as well as their length and direction of extension. They can extend in opposed directions and are preferably equally spaced circumferentially but do not need to be. The length of each arm and its dimensions and material of construction are preferably identical but do not need to be. The weights 34 can be equally spaced from the outer member as other weights on the same side or on the opposite side but do not need to be. The position of arms 28 on one side can be offset radially or circumferentially from arms 28 extending out the opposite side of the outer member 22. On one side of outer member 22 arms 28 can be at the same or different radial distances from the shaft centerline. Optionally arms 28 that extend in opposite directions can be a unitary structure that goes through the outer member 22. Weights 34 of different weight can be used on different arms 28 and at different extension dimension from the outer member 22. One or more weights of equal or unequal value can be placed on a single arm 28. The cantilevered arms themselves can also be used without an associated weight. The configuration of the arm 28 can be the desired weight but such an option is not simply adjusted but is rather designed for a specific application.

Taking the well known formulas for making the vibration dampener VD respond to one or more resonant frequencies of the shaft 12 the configuration of the vibration dampener VD can be mathematically modeled to response to a targeted shaft vibration. The effective spring rate of the vibration dampener VD can be adjusted in the formula where the targeted shaft vibration frequency is made equal to the square root of the effective spring rate divided by the effective mass of the vibration dampener VD.

Figure 3:
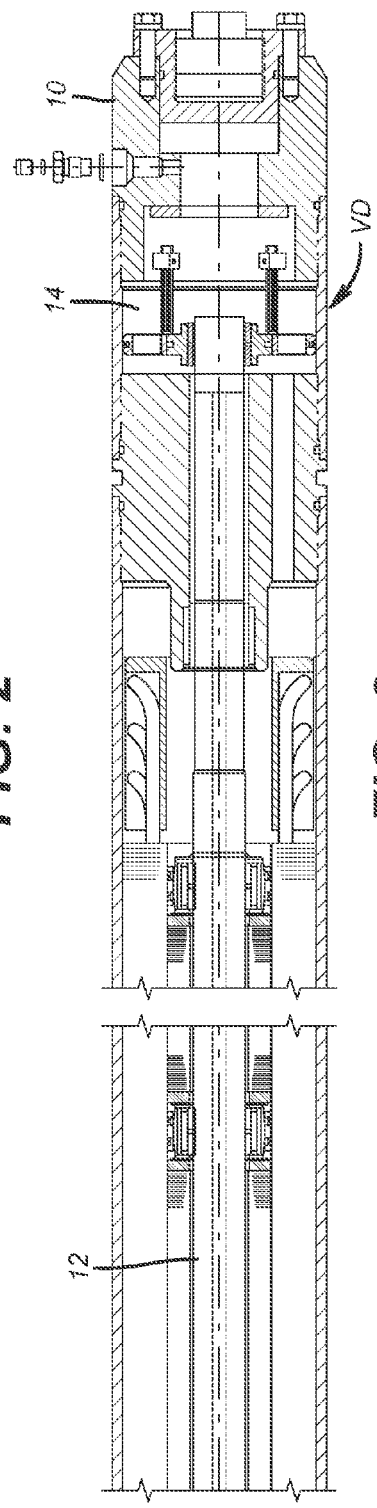
FIG. 3 is an overall view of the assembly locating its position in a partial view of a motor housing.

It should also be noted in FIG. 3 that the housing 10 can be lengthened in an existing product to make the annular space 14 longer to accommodate the arms 28 extending in one or both directions while still connected to the shaft 12. The vibration of the weights 34 also can cause turbulence in the lubricating material in the housing 10 so that the heat transfer through the wall of housing 10 can be improved while dampening the vibration of the shaft 12.

When used in the preferred application of an ESP, the present system presents high flexibility of adjustment and the employment of a limited surrounding space. The independent nature of the arms and the ability to locate or move weights on each arm allows for simpler optimization and the ability to use the same system on motor drivers of different pump sizes. Of course the design can be used with bearings on shafts in other applications whether space is limited or not.

The above description is illustrative of the preferred embodiment and many modifications may be made by those skilled in the art without departing from the invention whose scope is to be determined from the literal and equivalent scope of the claims below:

I claim:

1. A bearing vibration isolation system for a subterranean rotating shaft in a surrounding housing, comprising:

a rotating shaft extending in a surrounding housing with a bearing mounted to said housing and supporting said shaft;

said bearing further comprises an outer ring in contact with said housing, said outer ring further comprising at least one cantilevered elongated arm supported by said outer ring, said elongated arm extending away from said outer ring in an annular space between and without contact of said rotating shaft and said surrounding housing and without further contact of said outer ring and moving in response to input shaft vibration to dampen vibration at the shaft.

2. The system of claim 1, wherein:
said at least one cantilevered arm comprises at least one weight.

3. The system of claim 2, wherein:
said at least one cantilevered arm comprises a plurality of arms.

4. The system of claim 1, wherein:
said housing is part of a motor for an electric submersible pump.

5. The system of claim 4, wherein:
an extension to elongate said motor housing for an electric submersible pump;
said at least one cantilevered arm extending into said extension.

6. The system of claim 3, wherein:
said plurality of arms extend in at least one direction along said shaft.

7. The system of claim 6, wherein:
said plurality of arms extend substantially parallel to said shaft.

8. The system of claim 6, wherein:
said plurality of arms extend in opposed directions along said shaft.

9. The system of claim 8, wherein:
said plurality of arms are spaced equally or unequally in a radial direction from said shaft.

10. The system of claim 8, wherein:
said plurality of arms are spaced equally or unequally in a circumferential direction in a direction of axial extension parallel to said shaft.

11. The system of claim 8, wherein:
said plurality of arms that extend in opposed directions comprise a unitary structure extending through said outer ring.

12. The system of claim 8, wherein:
said plurality of arms are identical or different in length.

13. The system of claim 8, wherein:
said plurality of arms each comprise at least one weight.

14. The system of claim 13, wherein:
said at least one weight on each of said plurality of arms are identical or different.

15. The system of claim 8, wherein:
said plurality of arms each comprise an elongated slot through which a fastener is inserted to selectively position said weight along said arm;
each weight comprises a slot therethrough to slip over a respective arm.

16. The system of claim 8, wherein:
said outer ring further comprises at least one opening;
movement of said arms creates turbulence in a lubricant in said housing for enhancing heat transfer from said lubricant through said housing.

17. The system of claim 8, wherein:
said housing is part of a motor for an electric submersible pump.

18. The system of claim 17, wherein:
an extension to elongate said motor housing for an electric submersible pump;
said at least one cantilevered arm extending into said extension.

* * * * *